United States Patent [19]
Hayward

[11] 4,397,195
[45] Aug. 9, 1983

[54] FLOW SENSING DEVICES
[75] Inventor: Terence J. Hayward, Thirsk, England
[73] Assignee: HNL Instruments & Controls Limited, Essex, England
[21] Appl. No.: 284,094
[22] Filed: Jul. 16, 1981
[51] Int. Cl.³ .............................................. G01F 1/28
[52] U.S. Cl. ................................................. 73/861.74
[58] Field of Search ............ 73/861.71, 861.72, 861.74
[56] References Cited
FOREIGN PATENT DOCUMENTS
2328018 12/1974 Fed. Rep. of Germany ... 73/861.74

*Primary Examiner*—Howard A. Birmiel
*Attorney, Agent, or Firm*—Oblon, Fisher, Spivak, McClelland & Maier

[57] ABSTRACT

A flow sensing device comprises a shaft which is axially movable, and extends across a flow passageway, and carries an angled vane in the passageway. At each side of the passageway, the shaft is supported by a diaphragm which also prevents the leakage of fluid from the passageway beside the shaft. The two diaphragms are of equal area, so that any static pressure within the passageway does not result in a net pressure force tending to move the shaft axially. No other support is provided for the shaft.

8 Claims, 4 Drawing Figures

FLOW SENSING DEVICES

BACKGROUND OF THE INVENTION

I. Field of the Invention

This invention relates to flow sensing devices. Such devices may be used in a variety of applications; one particular field in which they find application is process control. A flow sensing device may be required to provide a digital (two-state) signal, indicating whether the flow is above or below a threshold value; alternatively, it may be required to provide an analogue signal indicative of the actual value of the flow. The present invention can be used in either of these situations.

II. Description of the Prior Art

Flow sensing devices have already been proposed in which some kind of vane is movably supported in the flow to be sensed; the force exerted by the flow impinging on the vane gives a measure of the flow rate. In these prior proposals, the vane has usually been mounted on an arm extending radially from a rotatable shaft at or near the side of the conduit carrying the flow, so that the vane can be moved in an arcuate path by the action of the flow. The shaft transmits the movement of the vane to some kind of measuring device outside the conduit, which device provides the output signal, and so a seal is required around the shaft where it leaves the conduit, to prevent the leakage of process fluid, but without impeding the rotation of the shaft.

SUMMARY OF THE INVENTION

The present invention is concerned with a flow sensing device which avoids the use of rotatable shafts and rotary shaft seals.

According to the present invention, a flow sensing device comprises a conduit for the flow, and a shaft extending across the conduit and carrying a flow deflecting member so shaped that flow through the conduit will exert on the flow deflecting member a force having at least a component directed axially of the shaft, the shaft extending out of the conduit through a hole in each side of the conduit, and being supported at each side of the conduit by a respective flexible support and sealing member, which also seals the hole in the conduit against fluid flow from the interior of the conduit through the hole, while the flexibility of the support and sealing members permits axial movements of the shaft with the flow deflecting member, and the support and sealing members being so dimensioned that any pressure force due to the static pressure within the conduit acting on one of the support and sealing members and tending to move the shaft axially in one direction is balanced by an equal but opposite pressure force due to the static pressure within the conduit acting on the other of the support and sealing members.

In most cases, the two support and sealing members will be identical to one another, to produce the necessary balancing of static pressure forces. One form which each of these support and sealing members may take is that of a flexible diaphragm, to the centre of which the shaft is secured. Another possible form is a bellows arranged coaxially about the shaft, one end of the bellows being secured to the shaft and the other end being sealingly connected to the wall of the conduit around the respective hole; and yet another possible form is an elastomeric bush surrounding and connected to the shaft, the outer periphery of each bush being sealed to the wall of the respective hole in the wall of the conduit.

The flow deflecting member may take various forms. In the preferred embodiment, it is a simple flat annular plate, whose plane lies at an angle to the direction of flow in the conduit. The size of this angle may be changed, according to the nature of the fluid which is expected to flow in the conduit and the expected rate of flow, but a typical angle might be 10°. Other forms of flow deflecting member can of course be used; for example, the flow deflecting member might have an aerofoil profile, and/or have a shape other than circular.

The shaft preferably lies at right angles to the direction of flow in the conduit. However, as an alternative, the shaft may lie at right angles to the plane of the flow deflecting member, especially when this is a plain circular plate. With such an arrangement, the assembly of shaft and flow deflecting member would be completely symmetrical about the axis of the shaft.

BRIEF DESCRIPTION OF THE DRAWINGS

The invention may be carried into practive in various ways, but four specific embodiments will now be described by way of example, with reference to the accompanying drawings, of which:

Each of FIGS. 1, 2, 3 and 4 is a longitudinal sectional view taken through a respective design of flow-sensing device embodying the invention.

DESCRIPTION OF THE PREFERRED EMBODIMENTS

Figure 1:
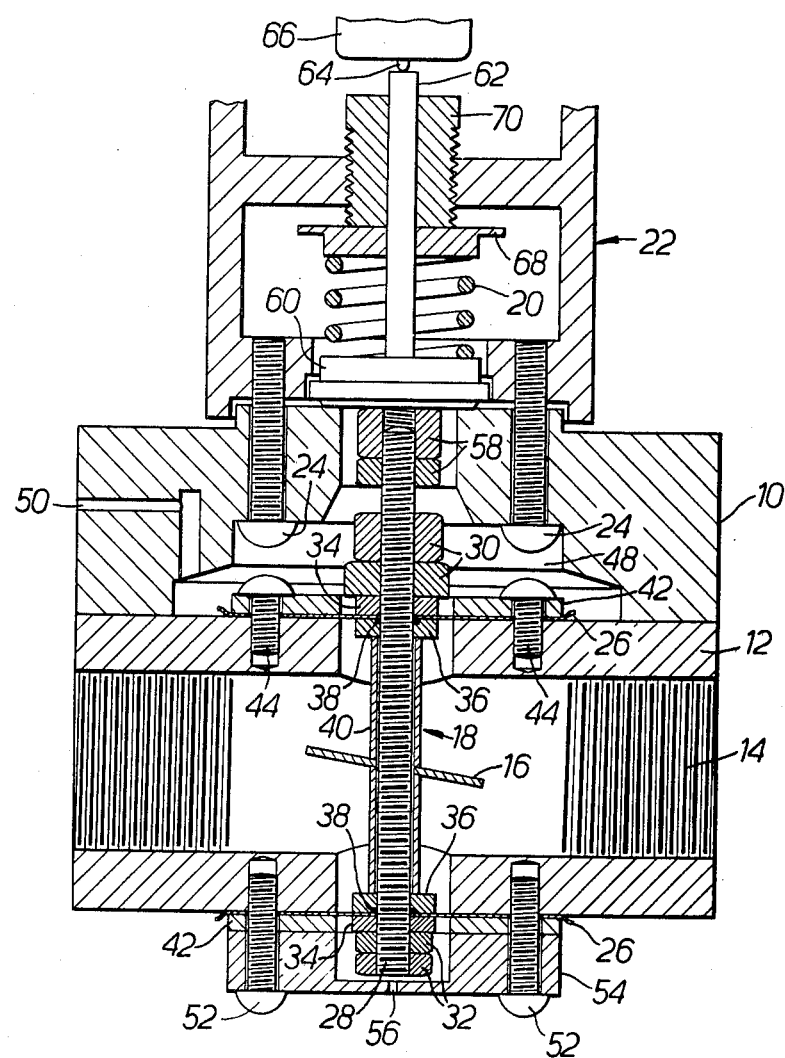

Referring first to FIG. 1, the first design of flow-sensing device includes a body comprising an upper portion 10 and a lower portion 12, held together by vertical screws (not shown). A fluid flow passageway 14 extends horizontally through the lower body portion 12, and is tapped at its end for connection to other pipework, so that the flow to be sensed passes through the passageway 14. The device also includes a switch unit 22 which is secured to the top of the upper body portion 10 by vertical screws 24.

The fluid flow is sensed by means of a flow sensing element 16, in the form of a vane inclined at about 10° to the direction of fluid flow. The vane 16 is mounted on a vertical shaft 18, which is vertically movable against the action of a compression spring 20 forming part of the switch unit 22. The shaft 18 extends out of both the top and the bottom of the fluid flow passageway 14, through vertical bores in the lower body portion 12 which are considerably larger in diameter than the shaft 18. The escape of fluid from the passageway 14 through these vertical bores is prevented by two diaphragms 26, one closing each of the bores; each diaphragm is secured at its outer periphery to the lower body portion 12, and has a central opening in which the shaft 18 is secured. These diaphragms provide the only support for the shaft 18, so that the shaft can move vertically, in response to fluid flow forces acting on the vane 16, without sliding friction. The diaphragms 26 may be metallic, or of a synthetic polymer or elastomer.

The details of the construction of the shaft 18 are as follows. The shaft 18 comprises a threaded central spindle 28, and a number of other components which have plain bores for reception over the spindle 28, and are clamped between an upper pair of locknuts 30 and a lower pair of locknuts 32. Starting from the bottom, the components clamped by the locknuts are: a spacer 34; the lower diaphragm 26; a further spacer 36, which has a rebate in its bore for receiving an O-ring seal 38; a tubular spacer 40 whose lower end is machined square to its axis, but whose upper end is angled at about 80° to its axis; and the vane 16, which takes the form of a plain annular washer. Above the vane 16, the spindle 28 passes through two further spacers which are identical to the spacers 40 and 36, with a further O-ring seal 38, through the upper diaphragm 26, through a further spacer 34, and then receives the upper locknuts 30. Because the vane 16 is received between the angled ends of the two tubular spacers 40, it lies at about 80° to the axis of the shaft 18, and since the shaft is at right angles to the length of the passageway 14, the vane 16 lies at about 10° to the direction of fluid flow.

The periphery of the upper diaphragm 26 is gripped between an upper surface of the lower housing portion 12 and an annular clamping plate 42, which is secured to the housing portion 12 by screws 44. The shaft 18 can therefore move vertically without much resistance. The plate 42 and the upper end of the shaft 18 are received in a cavity 48 in the underside of the upper body portion 10; this cavity is vented to atmosphere through a passage 50, so that the upper side of the upper diaphragm 26 is exposed to atmospheric pressure.

The periphery of the lower diaphragm 26 is, in a similar manner, clamped between the lower surface of the body portion 12 and a second clamping plate 42. The screws securing this clamping plate are shown at 52, and also secure a cover 54 which protects the lower end of the shaft 18 from mechanical damage. The cover 54 has a bore which accommodates the lower end of the shaft 18, and this bore is vented to atmosphere through a small hole 56, so that the pressure difference across the lower diaphragm 26 is the same as that across the upper diaphragm 26. The inner and outer diameters of the areas of the diaphragms which are exposed to this pressure difference are identical for the two diaphragms, so that, whatever the fluid pressure within the passageway 14, there will be no net static pressure force tending to move the shaft 18 up or down.

At its top end, the threaded spindle 28 carries a further pair of locknuts 58, of which the upper one is sufficiently long (in the axial direction) that it extends beyond the upper end of the spindle 28. The upper surface of the upper locknut 58 bears against the underside of a disc 60, on the upper surface of which the spring 20 acts. The spring 20 is housed in an interior cavity of the switch unit 22, and the rim of the disc 60 is received in a rebate formed around the lower end of this cavity, so that the disc 60 is trapped between the switch unit 22 and the upper body portion 10, with freedom for limited vertical movement. A spindle 62 extends upwards from the centre of the disc 60, and engages the operating button 64 of a microswitch 66, so that vertical movements of the vane 16 against the action of the spring 20 will operate the microswitch 66, and can therefore control other apparatus.

The upper end of the spring 20 bears against an abutment disc 68, whose position can be vertically adjusted by rotating a threaded adjuster 70, to vary the compression of the spring 20.

In operation, the flow of fluid from left to right (as seen in FIG. 1) through the passageway 14 is deflected around the vane 16, and this results in an upwards force on the vane 16. If the fluid flow is sufficiently large, the upwards force on the vane 16 becomes sufficient to overcome the force of the spring 20, so that the vane 16, and all the associated components (the shaft 18, the disc 60 and the spindle 62), will move upwards, and the microswitch 66 will be operated by the spindle 62. The rate of flow at which switching of the microswitch occurs can be varied by rotating the adjuster 70, to vary the force required to compress the spring 20.

Of course, the microswitch 66 could be replaced by means for generating other forms of output signal. For example, a pneumatic switching valve could be used, if the need is for a two-state pneumatic signal indicating simply whether the flow is above or below a threshold value. A further alternative is to replace the microswitch by some form of analogue sensor, so that the flow-sensing device provides a signal, for example an electrical or pneumatic signal, which is indicative of the actual value of the fluid flow.

Figure 2:
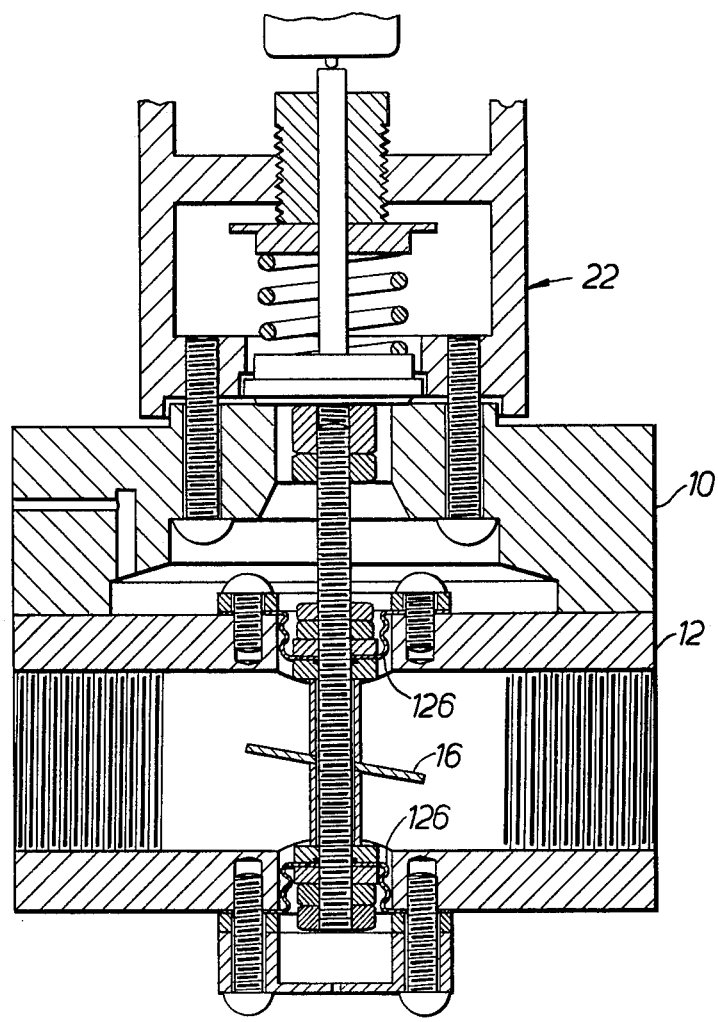

FIG. 2 shows a modification of the flow sensing device of FIG. 1, in which the diaphragms 26 are each replaced by a metallic bellows 126. The bellows occupy the two vertical bores in the lower body portion 12; in this example, the pressure within the passageway 14 is applied to the exterior of the bellows, the interior of the bellows being vented to atmosphere. As with the diaphragms 26, the dimensions of the upper bellows 126 are the same as those of the lower bellows, so that any static pressure in the passageway 14 does not produce a net vertical pressure force on the shaft 18.

Figure 3:
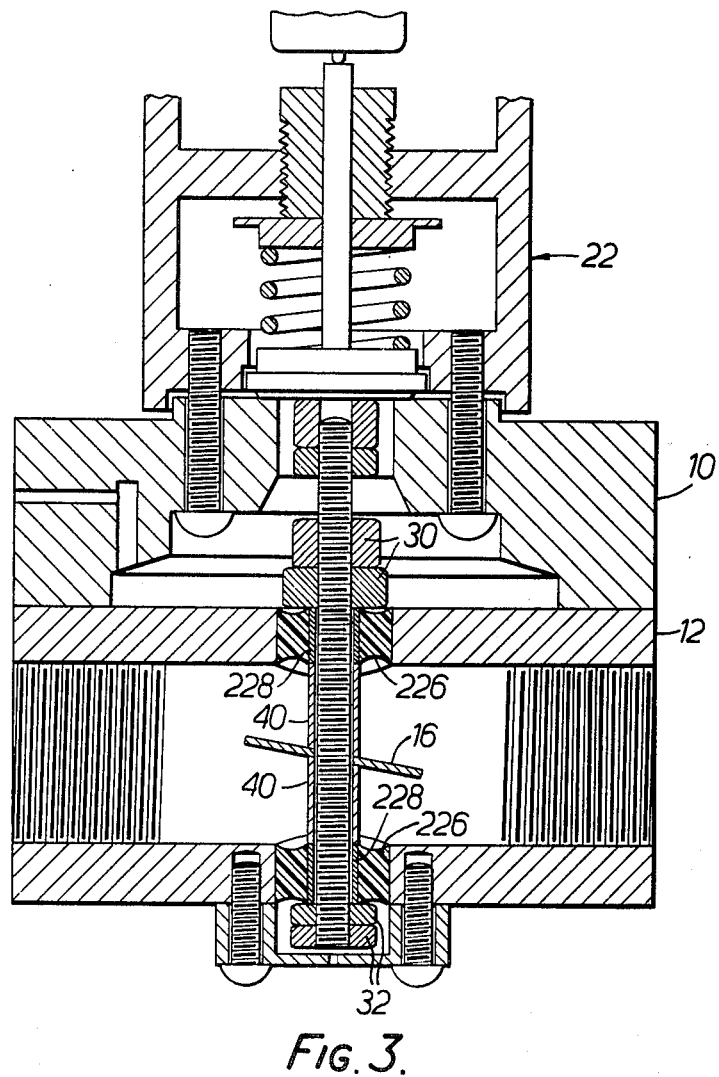

FIG. 3 shows a further modification, in which the shaft 18 is supported by two rubber bushes 226, each moulded into one of the vertical bores in the lower body portion 12. A metallic sleeve 228 is bonded into the centre of each of the bushes 226, and is clamped up with the various other components on the spindle 28 by the locknuts 30 and 32. This arrangement may have advantages if the flow in the passageway 14 is particularly aggressive.

Figure 4:
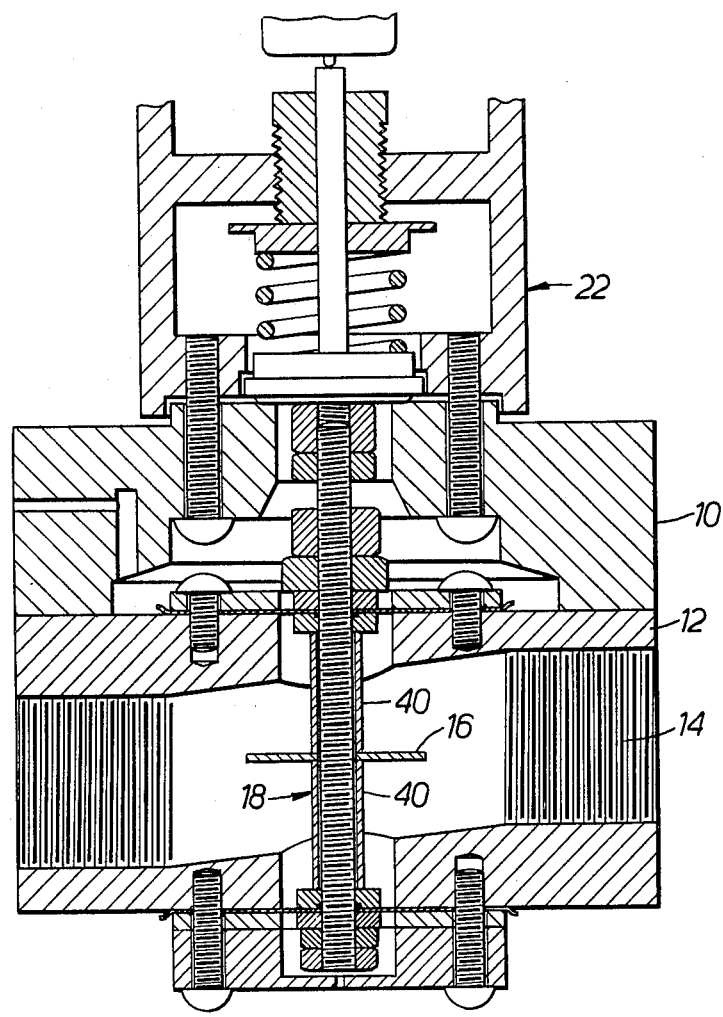

In the arrangement shown in FIG. 4, the shaft 18 is vertical, just as in the arrangement of FIG. 1, but the axis of the passageway 14 is inclined at about 10° to the horizontal. To keep the vane 16 at the same angle to the fluid flow direction as in FIG. 1, the ends of the spacers 40 are square, rather than being machined at 80°, so that in FIG. 4, the vane 16 lies at right angles to the axis of the shaft 18.

Of course, other modifications are possible. For example, if the sensing device is required to be able to provide an output signal at a value of flow which is close to zero, it may be necessary to provide a second spring opposing the action of the spring 20. Such an additional spring could be mounted in a further housing portion, similar to the upper housing portion 10, but inverted and attached to the underside of the lower housing portion 12. The use of such a spring would also make it possible to sense flow in the reverse direction, with either a switched or an analogue output signal.

The shape of the vane 16 may also be the subject of modifications, both in its plan shape and in its profile (as seen in the drawings). For example, the vane could have a streamlined or aerofoil shape; this might be desirable to reduce the pressure drop through the flow-sensing device.

What is claimed as new and is intended to be secured by Letters Patent is:

1. A flow sensing device comprising a conduit for the flow, a shaft extending across said conduit, a flow deflecting member carried by said shaft, said conduit being formed with a hole in each side, said shaft extending through each of said holes, and further comprising respective flexible support and sealing members for supporting said shaft in an axial and a radial direction of said shaft at each side of said conduit; said flow deflecting member being so shaped that flow through said conduit will exert on said flow deflecting member a force having at least a component directed axially of said shaft; said flexible support and sealing members also serving to seal said holes in said conduit against fluid flow from the interior of said conduit through said holes, while the flexibility of said support and sealing members permits axial movements of said shaft with said flow detecting member; and said support and sealing members being so dimensioned that pressure force due to the static pressure within said conduit acting on one of said support and sealing members and tending to move said shaft axially in one direction is balanced by an equal but opposite pressure force due to the static pressure within said conduit acting on the other of said support and sealing members.

2. A device as claimed in claim 1 further including a spring device acting on a portion of said shaft projecting beyond said support and sealing members, to control axial movements of said shaft under the effect of the force exerted by the flow on said flow deflecting member, and a transducer arranged to sense movements of a portion of said shaft projecting beyond said support and sealing members, and to provide an output signal representative of said movements.

3. A device as claimed in claim 2 wherein said flow deflecting member comprises a flat plate whose plane lies at an angle to the direction of flow in said conduit.

4. A device as claimed in claim 3, wherein said shaft lies at right angles to said plane of said flat plate.

5. A device as claimed in claim 4 wherein the axis of said shaft lies at right angles to the direction of flow in said conduit.

6. A device as claimed in any of claims 1 to 5 wherein each of said support and sealing members further comprise a flexible diaphragm, to the centre of each of which said shaft is secured.

7. A device as claimed in any of claims 1 to 5 wherein each of said support and sealing members further comprise a bellows arranged coaxially about said shaft, one end of said bellows being secured to said shaft and the other end being sealingly connected to the wall of said conduit around the respective hole.

8. A device as claimed in any of claims 1 to 5 wherein each of said support and sealing members further comprises an elastomeric bushing surrounding and connected to said shaft, the outer periphery of each bushing being sealed to the wall of the respective hole in the wall of said conduit.

* * * * *